US012664391B2

(12) United States Patent
Buescher

(10) Patent No.: US 12,664,391 B2
(45) Date of Patent: Jun. 23, 2026

(54) ENERGY HARVESTING WITH DUAL BUFFER CAPACITOR ARRANGEMENT

(71) Applicant: EM Microelectronic-Marin SA, Marin (CH)

(72) Inventor: Kevin Scott Buescher, Colorado Springs, CO (US)

(73) Assignee: EM Microelectronic-Marin SA, Marin (CH)

( * ) Notice: Subject to any disclaimer, the term of this patent is extended or adjusted under 35 U.S.C. 154(b) by 132 days.

(21) Appl. No.: 18/644,404

(22) Filed: Apr. 24, 2024

(65) Prior Publication Data

US 2024/0403591 A1      Dec. 5, 2024

(30) Foreign Application Priority Data

May 30, 2023     (EP) ..................................... 23176185

(51) Int. Cl.
*G06K 19/07*          (2006.01)
*H02J 50/00*          (2016.01)

(52) U.S. Cl.
CPC ..... *G06K 19/0726* (2013.01); *G06K 19/0707* (2013.01); *G06K 19/0715* (2013.01); *H02J 50/001* (2020.01)

(58) Field of Classification Search
None
See application file for complete search history.

(56) References Cited

U.S. PATENT DOCUMENTS

| 2006/0187049 A1* | 8/2006 | Moser .............. G06K 19/07749 |
| | | 340/693.1 |
| 2009/0146785 A1 | 6/2009 | Forster |
| 2009/0152954 A1* | 6/2009 | Le ........................... H02J 50/20 |
| | | 307/110 |
| 2018/0174010 A1 | 6/2018 | Buescher |

OTHER PUBLICATIONS

European Search Report for EP 23 17 6185, dated Nov. 8, 2023.

* cited by examiner

*Primary Examiner* — Thomas S Mccormack
(74) *Attorney, Agent, or Firm* — Sughrue Mion, PLLC

(57)          ABSTRACT

A system (10) including an energy harvesting circuit (12) connectable to an antenna (14) and configured to execute an autonomous matching procedure to match the antenna (14) to an electric load (15), a buffer capacitor (16) connected to the energy harvesting circuit (14) and chargeable by the energy harvesting circuit (14), and a control circuit (20) connected to the energy harvesting circuit (14) and to the buffer capacitor (16) and connectable to the electric load (15), wherein the control circuit (20) is configured to control a supply voltage of the electric load (15), and wherein the control circuit (20) comprises an auxiliary capacitor (22) chargeable during execution of the autonomous matching procedure.

19 Claims, 2 Drawing Sheets

ENERGY HARVESTING WITH DUAL BUFFER CAPACITOR ARRANGEMENT

CROSS REFERENCE TO RELATED APPLICATIONS

This application claims priority to European Patent Application No. 23176185.9 filed May 30, 2023, the entire contents of which are incorporated herein by reference.

FIELD OF THE INVENTION

The present invention relates to the field of RFID tags, in particular to passive RFID tags provided with an autonomous impedance matching between an energy harvesting circuit and an antenna.

BACKGROUND OF THE INVENTION

Energy harvesting circuit of passive RFID tags may be provide with a RF rectifier architecture which allows automatically matching the antenna to the integrated circuit or logic unit of the tag to achieve the best sensitivity over a wide band of RF frequencies. However, this circuitry requires time in an RF field to operate. In some RF protocols, there is only a limited time, e.g. 1.5 ms, of continuous wave (CW) field available to boot the tag. During such a limited time, the autonomous matching circuitry must first find the best operating configuration before the tag can boot which reduces the amount of boot time.

A key component in the time required to boot a tag is the time that is necessary to ramp up the supply voltage to a level that is sufficient to operate the internal circuitry of the tag. One necessary component is a buffer capacitor. The purpose of the buffer capacitor is to provide an energy reservoir allowing the tag to continue to operate when the RF field is not present such as during modulation, backscatter, or low RF field conditions. The capacitor stores energy when there is excess RF energy and releases energy when there is a deficit of RF energy. A larger buffer capacitor is desirable as it allows a tag to continue to operate longer when the RF field is insufficient to supply all the energy required for the tag to function properly. However, a comparatively large buffer capacitor also means that it takes longer to charge the same, which can be problematic in an automatched RF frontend due to the reduced time allowed for the tag to boot after the automatch function completes.

It is therefore desirable to provide improvements to passive RFID systems and RFID circuits that enables a rather fast and reliable booting or power-up of the RFID tag or RFID circuit. The solution should be easy to implement and cost efficient.

SUMMARY OF THE INVENTION

In one aspect, there is provided a system, typically implemented in a RFID circuit or RFID tag. The system is particularly configured for passive RFID applications. The system comprises an energy harvesting circuit, which is connectable to an antenna and which is configured to execute an autonomous matching procedure to match the antenna to an electric load of the system or an electric load of the RFID tag. In the following the autonomous matching procedure may be also denoted as autotuning.

The system further comprises a buffer capacitor connected to the energy harvesting circuit and chargeable by the energy harvesting circuit. The system further comprises a control circuit connected to the energy harvesting circuit and connected to the buffer capacitor. The control circuit is further connectable to the electric load. The control circuit is further configured to control a supply voltage of or for the electric load.

The control circuit further comprises an auxiliary capacitor, which is chargeable during execution of the autonomous matching procedure.

In a function mode of the system and in particular after completion of the autonomous matching procedure, the auxiliary capacitor may act and behave as a supplemental buffer capacitor, which concurrently with the original buffer capacitor is operable to store energy and to provide electrical energy allowing the system, e.g. the RFID tag, to continue to operate when the RF field is not present such as during modulation, backscatter or low RF field conditions.

However since the auxiliary capacitor is chargeable or is charged during execution of the autonomous matching procedure and in order to initiate the autonomous matching procedure it may be only necessary to charge the buffer capacitor to a first charging level. Execution of the autonomous matching procedure may start before the auxiliary capacitor will the charged. Insofar, the autonomous matching procedure may be triggered and may be executed well before the total capacitance provided by the buffer capacitor and the auxiliary capacitor is charged, e.g. to a second or maximum charging level. In other words, the auxiliary capacitor may contribute to a total capacitance. A total buffer capacitance of the system may be provided by the buffer capacitor and by the auxiliary capacitor.

Upon activation of the system, it may be sufficient when initially only the buffer capacitor is charged and when the autonomous matching procedure will be executed as soon as the buffer capacitor has been charged to a first charge level. Thereafter, the autonomous matching procedure can be conducted or executed during which the auxiliary capacitor can and will be charged at least to a pre-defined extent or charging level.

Upon completion of the autonomous matching procedure the remainder or residual capacitance of the available capacitance of the system, e.g. a residual part of the buffer capacitor and/or or a residual part of the auxiliary capacitor, can be fully charged.

The present system is beneficial in that prior to the completion of the autonomous matching procedure there is less energy available to operate the electrical load and/or to ramp up the supply voltage since the energy harvesting circuit may be mismatched to the antenna. By charging the buffer capacitor prior to conduct or to execute the autonomous matching procedure execution of the autonomous matching procedure may start earlier.

The present system is beneficial in separately charging the buffer capacitor and the auxiliary capacitor based on how much energy is available by the energy harvesting circuit. Typically, and to improve sensitivity, the autonomous matching procedure may operate at a lower voltage and current compared to a function mode of the system or control circuit. Insofar, autotuning or autonomous matching between the energy harvesting circuit and the antenna can be successfully completed under such mismatched conditions. Once the tuning or autonomous matching is complete, the energy harvesting circuit is well matched to the antenna and therefore more power will be available to operate the entire system.

In some examples, the autonomous matching procedure and the energy harvesting circuit may only operate when there is present a CW RF field. Here, a large buffer capacitor may not be necessary. By splitting the total capacitance of the system into the buffer capacitor and the auxiliary capacitor, the auxiliary capacitor can be charged at a later stage compared to an initial charging of the buffer capacitor. It can be at least partially charged during execution of the autonomous matching procedure and then both capacitors can be charged to a higher or second level at or after completion of the autonomous matching or autotuning when more energy is available due to the matching of the energy harvesting circuit with the antenna, thus reducing the amount of time to charge those capacitors to a desired level.

In a further example, the buffer capacitance for the energy harvesting circuit and/or for the electric load is separated into at least two capacitors, namely into a buffer capacitor and the auxiliary capacitor, wherein the auxiliary capacitor is or can be trickle charged during the autonomous matching procedure if there is excess electrical energy during the autonomous matching procedure derived from or provided by the energy harvesting circuit. After completion of the autonomous matching procedure the auxiliary capacitor and the buffer capacitor may be combined in that they are arranged in parallel.

In general, a voltage across a capacitor is given by the following integral:

$$V(t) = \frac{1}{C} \int i\, dt,$$

wherein V(t) is the supply voltage over time, wherein C is the capacitance of the buffer capacitor and wherein i is the charging current as provided by the energy harvesting circuit.

Accordingly, and by reducing the size of the capacitance the desired voltage may be achieved faster for the same amount of current. Therefore, it is advantageous to reduce the size of the buffer capacitor compared to prior art solutions in order to minimize the time required to reach a necessary voltage upon or after a start of energy harvesting from an external RF field. However, and after completion of an autonomous matching procedure a larger buffer capacitance may be required to prevent excessive voltage drops during operation of the electric load, e.g. during RF modulation. As the autonomous matching procedure progresses an optimal match to the antenna will be found or obtained, which will cause the energy harvesting circuit to produce more current. This additional current can then be used to charge the residual capacitance of the combination of the auxiliary capacitor and the buffer capacitor.

According to a further example the control circuit is either operable in an antenna matching mode or in a function mode. The control circuit is switchable from the antenna matching mode into the function mode upon or after completion of the autonomous matching procedure.

In some examples, the control circuit may be in the antenna matching mode per default. It may be then that the energy harvesting circuit starts to receive or to harvest energy from a RF field even under mismatched conditions to thereby charge the buffer capacitor at least to a first charge level. Upon reaching of the first charge level the control circuit may start to operate in the autonomous matching mode concurrent with the energy harvesting circuit conducts or executes the autonomous matching procedure. During execution of the autonomous matching procedure and since the control circuit is operating in the antenna matching mode the auxiliary capacitor is successively charged during execution of the autonomous matching procedure. Here, the auxiliary capacitor may be trickle charged. It may be charged step by step with excessive energy obtainable from the energy harvesting circuit during the autonomous matching procedure. In this in this way excess energy is not wasted but is rather efficiently used to charge the auxiliary capacitor. Insofar, the present system is rather efficient also in terms of an energy consumption.

According to a further example, the control circuit comprises a switching arrangement operable to switch the control circuit between the antenna matching mode and the function mode. The switching arrangement may be controlled by a switch input operated by the control circuit itself, by the electric load and/or by the energy harvesting circuit. The switching arrangement may be implemented by one or numerous MOSFET devices, such as NMOS transistors and/or PMOS transistors. Switching between the antenna matching mode and the function mode may be controlled by a digital switching signal being indicative of the autonomous matching procedure. Hence, during the autonomous matching procedure the digital control signal is at a first signal level. Upon completion or termination of the autonomous matching procedure the digital control signal changes its value.

According to a further example and when the control circuit is in the function mode the auxiliary capacitor is in parallel to the buffer capacitor. Hence, and when in the function mode, the total buffer capacitance of the system is provided by the capacitance of the buffer capacitor and by the capacitance of the auxiliary capacitor. The individual capacitances of the auxiliary capacitor and the buffer capacitor then contribute to the total buffer capacitance of the system. This way, there can be provided a comparatively large buffer capacitance for the system, which is beneficial to extend an operation time of the system and/or of the electric load when an external RF field should not be or no longer present. The comparatively large buffer capacitance allows a continuous operation of the system, e.g. during modulation, backscatter or low RF field conditions.

In some examples, the capacitance of the auxiliary capacitor may be larger than the capacitance of the buffer capacitor. A buffer capacitor with a rather small capacitance may be beneficial to accelerate the initial charging to a predefined charging level under mismatched conditions.

Excess RF energy may be released from the buffer capacitance, i.e. from the combination of the buffer capacitor and the auxiliary capacitor every time when there should be a deficit of RF energy to the system.

According to a further example, the control circuit comprises a voltage limiter connected to an output of the energy harvesting circuit. Typically, the voltage limiter serves to regulate the voltage of the system at a desired voltage to operate the electric load and to prevent damage to any of the components of the system due to an over voltage condition.

By way of the voltage limiter there can be derived excess energy or excessive voltage from the energy harvesting circuit, e.g. during the autonomous matching procedure, which excess energy is sufficient and/or configured to charge or to trickle charge the auxiliary capacitor during execution of the autonomous matching procedure.

According to a further example, the voltage limiter is connected to the auxiliary capacitor and is operable to charge the auxiliary capacitor when the control circuit is in the antenna matching mode. In this way, excess energy provided at or derived from the voltage limiter can be effectively used to charge, e.g. to trickle charge the auxiliary capacitor when and as long as the control circuit is in the antenna matching mode.

Typically, switching of the control circuit into the antenna matching mode occurs concurrently with execution of the autonomous matching procedure by the energy harvesting circuit. Upon termination or completion of the autonomous matching procedure the control circuit switches from the antenna matching mode into the function mode, thereby switching the auxiliary capacitor in parallel to the buffer capacitor so as to provide an enlarged or combined buffer capacitance for the entire system.

According to a further example, the voltage limiter comprises a shunt limiter operable to shunt excess current to ground. Typically, the shunt limiter comprises a OTA (operational transconductance amplifier), whose differential input voltage produces an output current. The OTA comprises a reference voltage input and a bias voltage input and further comprises an input connected to a supply voltage. The supply voltage is provided by the energy harvesting circuit. The shunt limiter further comprises at least one of an NMOS or PMOS transistor to shunt excess current to ground.

Typically, the shunt limiter is operable to shunt excess energy or current to ground in order to prevent excess current produced by the energy harvesting circuit, e.g. produced by RF rectifier or energy harvesting circuit, from generating too much voltage. The auxiliary capacitor is connected to the shunt limiter or is coupled to the shunt limiter so as to become charged by excess current provided or derived from the shunt limiter.

According to a further example, the auxiliary capacitor is exclusively chargeable by the excess current provided by the shunt limiter. Excess current may be provided or derivable from the shunt limiter in regular or irregular time intervals during the autonomous matching procedure. Every time the shunt limiter derives excess current from the energy harvesting circuit and/or from the control circuit, a respective current or charge is used to trickle charge the auxiliary capacitor until the autonomous matching procedure has completed.

By way of the voltage limiter, e.g. by way of the shunt limiter, it can be somewhat guaranteed, that there is always sufficient voltage present to operate the control circuit since no current will be shunted until a predefined voltage, e.g. a first voltage level has been reached or obtained from the energy harvesting circuit.

The autonomous matching procedure as conducted by the energy harvesting circuit may be configured to determine a trim setting that produces a maximum of a current shunted to ground as this indicates that the energy harvesting circuit and/or the RF rectifier is producing the most power and thus has the best match to the antenna.

By exclusively charging the auxiliary capacitor by excess current provided by the shunt limiter such excess current, which is normally wasted because it is shunted to ground, can now be used to trickle charge the auxiliary capacitor. Insofar, by exclusively charging the auxiliary capacitor by the excess current provided by the shunt limiter an increase of energy efficiency of the entire system can be obtained.

According to a further example, the system comprises a current mirror with a first branch and a second branch. The first branch forms part of the voltage limiter, e.g. it forms part of the shunt limiter. The auxiliary capacitor is connected to or forms part of the second branch.

By making use of a current mirror, the excess current as provided by the voltage limiter or shunt limiter during the autonomous matching procedure can be mirrored into the second branch of the current mirror and can be used to trickle charge the auxiliary capacitor during the autonomous matching procedure. In this way a ratioed amount of the shunt current can be used to charge of the auxiliary capacitor. Moreover, making use of a current mirror for charging the auxiliary capacitor is beneficial in that the charging of the auxiliary capacitor has no drawback or effect onto the operation of the shunt limiter or voltage limiter.

According to a further example the switching arrangement of the control circuit comprises a PMOS transistor and a NMOS transistor. Here, and as a further example a gate of the PMOS transistor is connected to gate of the NMOS transistor and is further connected to a switch input providing a control signal being indicative of one of the antenna matching mode and the function mode. Typically, and by way of the control signal which may be a digital control signal and which may be either at a logic high or logic low value, the operation mode of the control circuit can be derived or determined.

For instance, and when the control signal is at a first logic level the control circuit is in one of the matching mode and a function mode. When the control signal is at the other logic level the control circuit is in the other one of the matching mode and the function mode. By connecting the gate of the PMOS transistor and the NMOS transistor to the switch input a concurrent switching of the PMOS transistor and the NMOS transistor can be obtained when the control signal as provided at the switch input changes its digital value. In this way, the auxiliary capacitor can be switched from a charging mode during the antenna matching mode into a buffer mode, in which the charge stored in the auxiliary capacitor can be used as a buffer charge to provide or to support continuous operation of the system, e.g. if external RF conditions should not be met or should be insufficient to operate the system.

According to a further aspect, the present invention also relates to a passive RFID circuit, e.g. to a passive RFID tag. The passive RFID circuit comprises an antenna, an electric load and a system as described above. Here, the energy harvesting circuit of the system is connected to the antenna and the electric load is connected to the energy harvesting circuit via the control circuit and the buffer capacitor. Insofar, all features, effects and benefits as described above in connection with the system equally apply to the passive RFID circuit; and vice versa.

According to another aspect, the present invention further relates to a method of charging capacitors of a system, e.g. of a system as described above. The system comprises an energy harvesting circuit connectable to an antenna and being configured to execute an autonomous matching procedure to match the antenna to an electric load. The system further comprises a buffer capacitor connected to the energy harvesting circuit. The system further comprises a control circuit connected to the energy harvesting circuit and the system further comprises an auxiliary capacitor connectable to the energy harvesting circuit, e.g. selectively connectable to the energy harvesting circuit.

The method of charging the capacitors comprises the steps of charging the buffer capacitor, executing the autonomous matching procedure, e.g. with energy provided from the energy harvesting circuit, and charging the auxiliary capacitor during execution of the autonomous matching procedure as conducted by the energy harvesting circuit.

In this way execution of the autonomous matching procedure may start comparatively early, namely when the buffer capacitor, which may be of reduced size compared to prior art solutions, has been charged to a first predefined level. In effect, and by making use of the buffer capacitor and the auxiliary capacitor, the total buffer capacitance of the system can be split at least into the capacitance of the buffer capacitor and the capacitance of the auxiliary capacitor. During a startup of the system, it may be sufficient to only charge the buffer capacitor, which charging may be conducted even under mismatched conditions between the antenna and the energy harvesting circuit.

However, since the buffer capacitor is reduced in size and comprises a capacitance, which is small compared to the total capacitance provided by the combination of the buffer capacitor and the auxiliary capacitor, charging of the buffer capacitor to a predefined charge level may be conducted or obtained in a comparatively short time interval. Thereafter, the autonomous matching procedure may start, which leads to a much more efficient harvesting of electrical energy from the external RF field. During the autonomous matching procedure the auxiliary capacitor may be charged by excess energy or excess current as provided by a voltage limiter of the control circuit. Thereafter and upon completion of the autonomous matching procedure the buffer capacitor and the auxiliary capacitor may be switched in parallel and may be concurrently and/or simultaneously charged to a second charge level until a maximum charge level has been reached.

According to a further example execution of the autonomous matching procedure is initiated when the buffer capacitor has been charged to a first charge level by the energy harvesting circuit. As described above and since the capacitance of the buffer capacitor may be reduced compared to the total capacitance as provided by the sum of the capacitances of the buffer capacitor and the auxiliary capacitor the time interval required to charge the buffer capacitor to the first charge level may be reduced compared to solutions that comprise only one comparatively large buffer capacitor.

Moreover and according to a further example, the auxiliary capacitor is charged by excess current provided by a voltage limiter of the control circuit during execution of the autonomous matching procedure. In this way, excess electric energy as obtained or derived by the voltage limiter can be effectively used to trickle charge the auxiliary capacitor during the autonomous matching procedure.

According to a further example of the method of charging capacitors, the buffer capacitor and the auxiliary capacitor are charged to a second charge level upon or after completion of the autonomous matching procedure. Here, the first and the second auxiliary capacitors may be arranged or switched in parallel, so as to form or to constitute a total buffer capacitance of the system and/or of the passive RFID circuit.

BRIEF DESCRIPTION OF THE DRAWINGS

In the following, some examples of a system for a passive RFID tag are illustrated are illustrated in greater detail by making reference to the drawings, in which.

DETAILED DESCRIPTION

Figure 1:
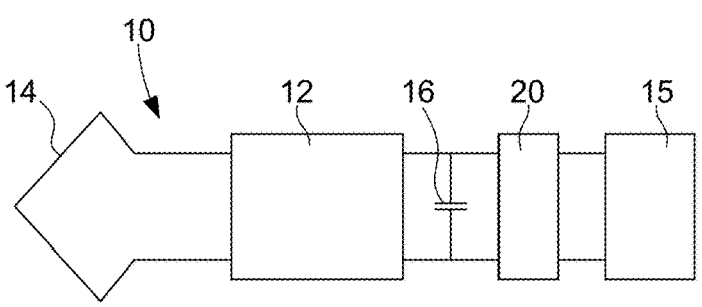
FIG. 1 schematically illustrates a circuit diagram of an example of the system and/or of a passive RFID circuit.

The system 10 as shown in FIG. 1 may be implemented as a passive RFID tag. The system 10 comprises an antenna

14 connected to an energy harvesting circuit 12. The system 10 further comprises a control circuit 20 and an electric load 15. The electric load 15 may comprise an integrated circuit, e.g. a digital processing unit of the system 10 and hence of the RFID tag. The energy harvesting circuit 12 is connected with the control circuit 20 via a buffer capacitor C1, 16. The buffer capacitor 16 is connected with two output terminals of the energy harvesting circuit 12 and is connected with two input terminals of the control circuit 20. The two output terminals of the control circuit 20 are connected to the electric load 15.

The system 10 according to FIG. 1 may be implemented as a passive RFID circuit or passive RFID tag. RF energy from an external RF field may be harvested by the antenna 14. For this it is required that the energy harvesting circuit 12 is correctly tuned or matched with the antenna 14.

Figure 2:
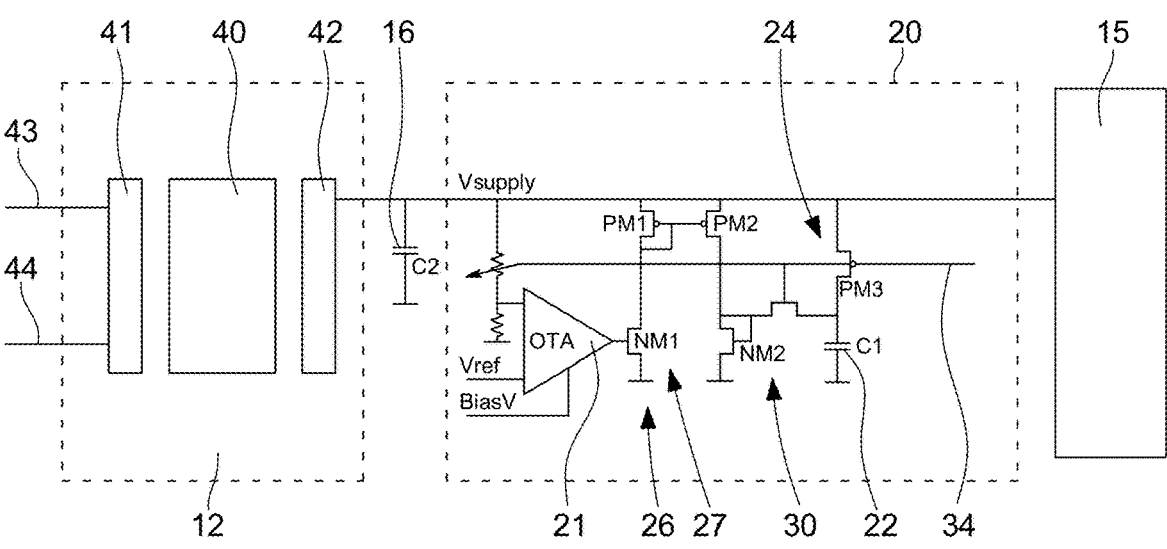
FIG. 2 shows the circuit diagram of FIG. 1 in more detail.

The energy harvesting circuit 12 is operable to execute a so-called autonomous matching procedure or an autotune procedure. As indicated in FIG. 2, the energy harvesting circuit 12 comprises a RF rectifier 40, which is connected to a ground generator 41. The ground generator 41 is connected to the two antenna terminals 43, 44. The RF rectifier 40 is further connected to a signal combiner 42, which in turn is connected to the buffer capacitor 16. Hence, a supply terminal or supply line connected to the signal combiner 42 and providing electric energy to the system is connected with one end of the buffer capacitor 16. An opposite end of the buffer capacitor 16 is connected to ground.

The supply line as provided by the signal combiner 42 is further connected to the control circuit 20. The supply line extends through the control circuit 20 and is further connected to the electric load 15.

Figure 3:
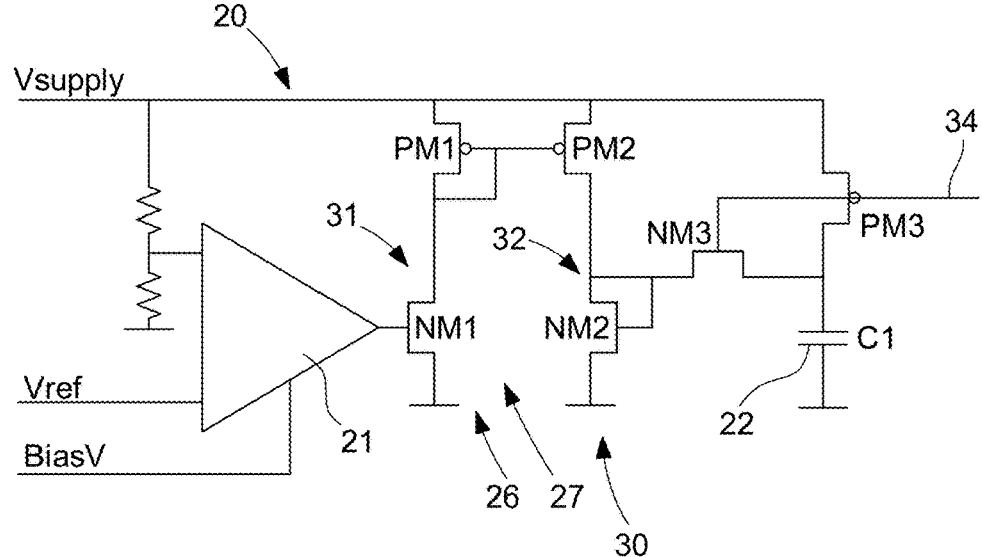
FIG. 3 is indicative of a circuit diagram of the control circuit.
Figure 4:
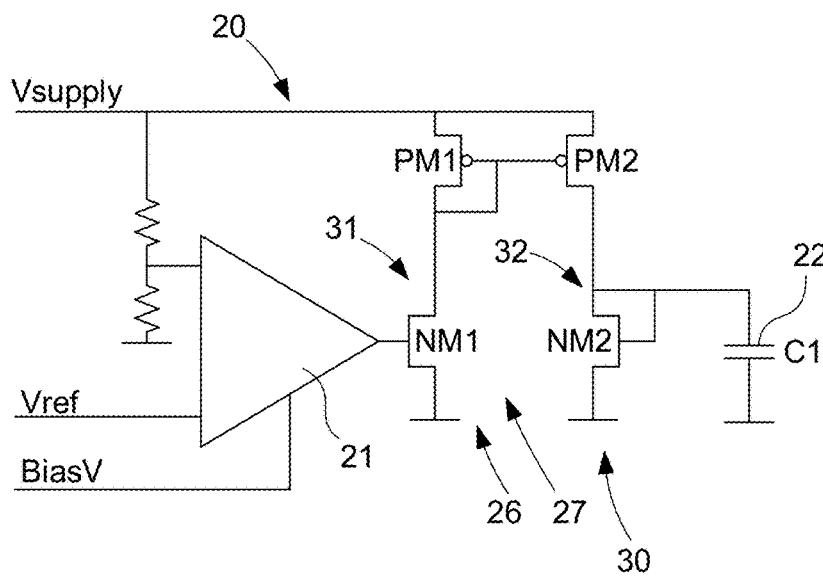
FIG. 4 shows a portion of the circuit diagram of FIG. 3.

An example of a control circuit 20 is apparent from the illustration and description of FIGS. 3 and 4. The control circuit 20 comprises an auxiliary capacitor C1, 22, which is chargeable during execution of the autonomous matching procedure of the energy harvesting circuit 12. The control circuit 20 comprises a voltage limiter 26, e.g. implemented as a shunt limiter 27. The shunt limiter 27 comprises an OTA 21 comprising a reference voltage input and a bias voltage input and further comprising a supply voltage input. An output of the OTA 21 is connected to the gate of an NMOS transistor NM1. The source of NM1 is connected to the supply voltage, e.g. via a further transistor, a PMOS transistor PM1.

The voltage limiter 26 and hence the shunt limiter 27 comprises the OTA 21 and the NMOS transistor NM1. This way, an excess current produced by the RF rectifier 40 during the autonomous matching procedure or during operation of the energy harvesting circuit 12 may be shunt to ground. In this way, the voltage level can be controlled and damage to further components of the system 10 can be effectively prevented.

The control circuit 20 further comprises a current mirror 30. The current mirror 30 comprises a first branch 31 at a second branch 32. The first branch comprises a PMOS transistor PM1 and the NMOS transistor NM1. The source of PM1 is connected to the supply voltage. The drain of NM1 is connected to the source of PM1. The gate of PM1 is connected to the gate of a second PMOS transistor PM2 of the second branch 32.

The second branch 32 comprises the PMOS transistor PM2 and a further NMOS transistor NM2. The gate of PM1 is further connected to the drain of PM1. The auxiliary capacitor C1, 22 is connected to ground with one end and is connected to the second branch 32 with its second end. It is typically connected to the source of an NM2 and to the drain of PM2.

By way of the current mirror 30, a current in NM1 is mirrored to NM2 via PM1 and PM2. Thus and when the limiter is shunting current, a rationed amount, which is determined by the size ratio of PM1 and PM2, of the current in NM1 flows through PM2 and begins to charge up the auxiliary capacitor C1, 22. The voltage on the auxiliary capacitor 22 is clamped at the voltage V (t) of PM2, which in some examples may be approximately 650 mV. This way, PM2 is prevented from collapsing and changing the current in NM1.

By way of the current mirror 30, a portion of the excess current, which is normally shunted to ground can be used to trickle charge the auxiliary capacitor C1, 22. The feedback loop as implemented with the voltage limiter 26 and hence by the shunt limiter 27 serves to control the current through NM1. This allows the feedback loop to fix a supply voltage at a predefined voltage level, e.g. at about 750 mV.

In the automatch scenario, the algorithm and hence operation of the voltage limiter 26 does not begin to operate until a small amount of current is shunted to ground. This guarantees that there is sufficient voltage present to operate the energy harvesting circuit 12 and the control circuit 20 in a way as described herein. Apparently, no current will be shunted until a proper voltage supply is reached.

The control circuit 20 further comprises a switching arrangement 24. The switching arrangement comprises a further NMOS transistor NM3 and a further PMOS transistor PM3. The gates of the transistors NM3 and PM3 are interconnected. They are further connected to a switch input 34, which may be operated by a digital logic, e.g. of the energy harvesting circuit 12.

The source of an NM3 is connected to the drain of PM2 and to the drain of NM2. The gate of NM2 is connected to the source of NM3 and hence to the drain of PM2. The drain of NM3 is connected to the drain of PM3. The drains of NM3 and PM3 are connected to one terminal of the auxiliary capacitor C1, 22. The other terminal of the auxiliary capacitor C1, 22 is connected to ground. The source of PM3 is connected to the supply voltage.

By way of the switching arrangement 24, the control circuit 20 can be switched between an antenna matching mode and a function mode. In the antenna matching mode the auxiliary capacitor C1 is effectively connected to PM2 and is hence charged by a current through PM2. Here, NM3 is conductive and PM3 is inactive, e.g. it represents an open switch.

When the autonomous matching procedure has been completed, the digital control signal as provided by switch input 34 concurrently and/or simultaneously changes the configuration of the switching states of NM3 and PM3. Accordingly, the auxiliary capacitor 22 will be effectively disconnected from an NM2 and will be connected to the supply voltage via PM3. Thus, PM3 may represent a closed switch and NM3 may represent an open switch.

This way and when the autonomous matching procedure has been completed, the control signal as provided by the switch input 34 will disconnect the auxiliary capacitor 22 from PM2 and may connect the auxiliary capacitor C1, 22 directly to the supply voltage. Here, the PMOS transistor PM3 also prevents the supply voltage from dropping below a certain or predefined voltage that could cause the electric load 15 to reset. This limiting occurs because the supply voltage cannot drop below the voltage of PM3 or the path to the auxiliary capacitor becomes high impedance.

As a further example, which is not shown in detail, the automatch complete signal as provided by the switch input 34 may not change abruptly but may transition slowly over a predefined time interval to initially limit the amount of current that can flow into the auxiliary capacitor 22 to further prevent the supply voltage from dropping significantly. Apparently and in further examples, a final impedance of PM3, namely when the supply voltage is at the full operational voltage, must be low enough to allow the auxiliary capacitor to provide current to the electric load 15 when necessary without significant voltage drop.

The illustration of the control circuit 20 according to FIG. 4 distinguishes from the example of FIG. 3 to only illustrated the voltage limiter 26 and the current mirror 30 without showing the switching circuit 24.

Figure 5:
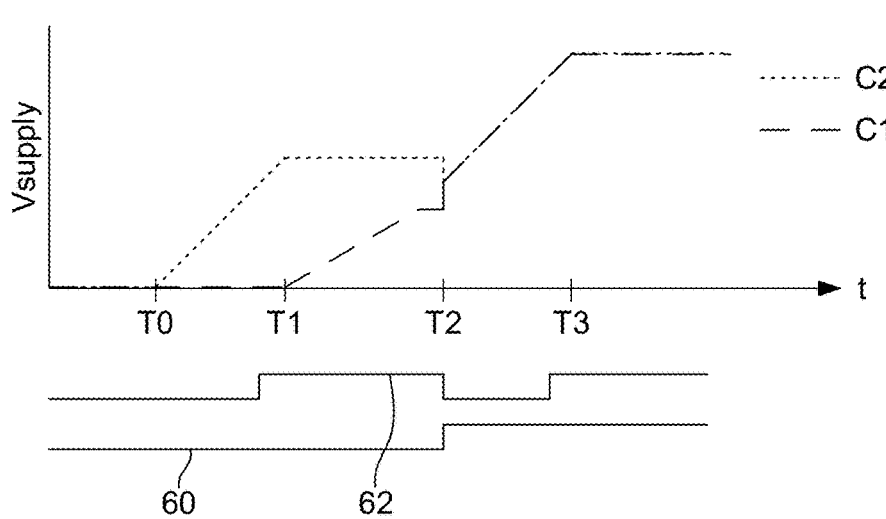
FIG. 5 shows a diagram of the supply voltage over time during charging of the capacitors of the system.

The diagram according to FIG. 5 shows the development of the supply voltage over time at the start of the system, e.g. when the system 10 is exposed to an external RF field.

At a time T0, the energy harvesting circuit 12 starts to harvest energy in a mismatched mode, i.e. where the energy harvesting circuit is not yet tuned to the antenna 14. The supply voltage ramps up to a first voltage level, e.g. 750 mV, which is reached at a time T1. At the time T1 the voltage limiter 26 of the control circuit 20 becomes active and starts to trickle charge the auxiliary capacitor 22. In the diagram, the charging level of the buffer capacitor C2, 16 is indicated as a dotted line. The respective charging level of auxiliary capacitor C1, 22 is illustrated by a dashed line. At the time T1 and every time the voltage limiter 26 shunts excess electrical energy from the RF rectifier 40 the auxiliary capacitor 22 is trickle charged until at time T2 the autonomous matching procedure terminates.

Termination of the autonomous matching procedure coincides with the generation of a respective automatch complete signal 60. The switching of the automatch complete signal 62 triggers an operation of the switching circuit 24. Here, the two capacitors C1, C2, hence the buffer capacitor 16 and the auxiliary capacitor 22 will be switched into a parallel configuration. The switching leads to a small drop in the charging level of the buffer capacitor 16 at the benefit and an abrupt rise in the charging level of the auxiliary capacitor 22 at the time T2.

Thereafter, the capacitors 16, 22 are simultaneously charged at a higher charging rate, which is now available since the energy harvesting circuit 12 is tuned with and/or matches with the antenna 14. As the charging level ramps up after time T2 the limiter 26 is inactive for a certain while. It becomes active again as the predefined voltage level and/or as a second charging level of the combined capacitors 16, 22 has been reached.

Figure 6:
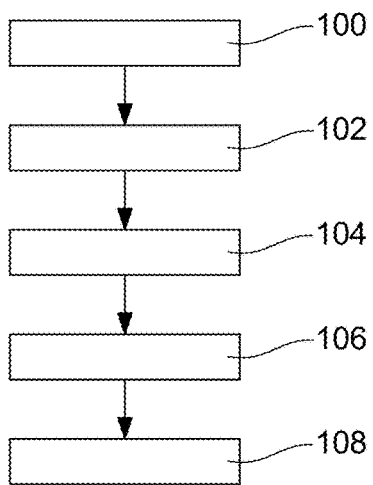
FIG. 6 is a flowchart of the method of charging capacitors of the system as described herein.

FIG. 6 shows a flowchart of a method of charging capacitors 16, 22 of a system 10 as described herein. Here, and in a first step 100 upon applying a RF field, the energy harvesting circuit 12 starts to produce and to provide a supply voltage by way of which the buffer capacitor 16 can be charged, e.g. to a first charging level. Thereafter and e.g. at a time T2, in step 102 execution of the autonomous matching procedure may start and the energy harvesting circuit 12 may starts to execute the autonomous matching or auto tune procedure. Concurrent with the autonomous matching procedure and during execution of the autonomous matching procedure as executed by the energy harvesting circuit the control circuit 20 is and remains in the antenna matching mode. During the autonomous matching procedure and as long as the control circuit 20 is in the antenna matching mode the auxiliary capacitor 22 will be trickle charged in step 104. Here, excess current that is shunted to ground by the voltage limiter 26 is used to charge the auxiliary capacitor 22 step by step.

Trickle charging of the auxiliary capacitor 22 continues until the autonomous matching procedure completes. Upon completion of the autonomous matching procedure the control circuit 20 switches from the antenna matching mode into the function mode in step 106. This switching may be obtained by providing a respective digital control signal via the switch input 34 in step 106.

By switching of the control circuit 20 into the function mode the buffer capacitor 16 and the auxiliary capacitor 22 will be electrically connected in parallel and will be charged to a maximum charge level in step 108. This final charting step will be conducted after completion of the autonomous matching procedure. Here, the energy harvesting circuit 12 may be suitably matched to the antenna 14 and harvesting of energy from the RF field will be more efficient compared to an energy harvesting under mismatched conditions before and/or during execution of the autonomous matching procedure.

REFERENCE NUMBERS 10 system
12 energy harvesting circuit
14 antenna
15 load
16 buffer capacitor
20 control circuit
21 OTA
22 auxiliary capacitor
24 switching arrangement
26 voltage limiter
27 shunt limiter
30 current mirror
31 first branch
32 second branch
34 switch input
40 RF rectifier
41 ground generator
42 signal combiner
43 antenna terminal
44 antenna terminal
60 signal
62 signal

The invention claimed is:

1. A system (10) comprising:
an energy harvesting circuit (12) connectable to an antenna (14) and configured to execute an autonomous matching procedure to match the antenna (14) to an electric load (15);
a buffer capacitor (16) connected to the energy harvesting circuit (14) and chargeable by the energy harvesting circuit (14);
a control circuit (20) connected to the energy harvesting circuit (14) and to the buffer capacitor (16) and connectable to the electric load (15), wherein the control circuit (20) is configured to control a supply voltage of the electric load (15); and
wherein the control circuit (20) comprises an auxiliary capacitor (22) chargeable during execution of the autonomous matching procedure, and
the control circuit (20) comprises a voltage limiter (26) connected to an output of the energy harvesting circuit (14) and is configured to charge the auxiliary capacitor (22) by excess current provided by the voltage limiter

(26) of the control circuit (20) during execution of the autonomous matching procedure.

2. The system (10) according to claim 1, wherein the control circuit (20) is either operable in an antenna matching mode or in a function mode and wherein the control circuit (20) is switchable from the antenna matching mode into the function mode upon or after completion of the autonomous matching procedure.

3. The system (10) according to claim 2, wherein the control circuit (20) comprises a switching arrangement (24) operable to switch the control circuit (20) between the antenna matching mode and the function mode.

4. The system (10) according to claim 2, wherein when the control circuit (20) is in the function mode, the auxiliary capacitor (22) is parallel to the buffer capacitor (16).

5. The system (10) according to claim 1, wherein the voltage limiter (26) is connected to the auxiliary capacitor (22) and is operable to charge the auxiliary capacitor (22) when the control circuit (20) is in an antenna matching mode.

6. The system (10) according to claim 1, wherein the voltage limiter (26) comprises a shunt limiter (27) operable to shunt excess current to ground.

7. The system (10) according to claim 6, wherein the auxiliary capacitor (22) is chargeable by excess current provided by the shunt limiter (27) when the control circuit (20) is in the antenna matching mode.

8. The system (10) according to claim 6, wherein the auxiliary capacitor (22) is exclusively chargeable by the excess current provided by the shunt limiter (27).

9. The system (10) according to claim 1, further comprising a current mirror (30) with a first branch (31) and a second branch (32), wherein the first branch (31) forms part of the voltage limiter (26) and wherein the auxiliary capacitor (22) is connected to or forms part of the second branch (32).

10. The system (10) according to claim 3, wherein the switching arrangement (24) comprises a PMOS transistor (PM3) and an NMOS transistor (NM3) and wherein a gate of the PMOS transistor (PM3) is connected to a gate of the NMOS transistor (NM3) and is connected to a switch input (34) providing a control signal being indicative of one of the antenna matching mode and the function mode.

11. A passive RFID circuit comprising:
an antenna (14);
an electric load (15); and
a system (10) according to claim 1, wherein the energy harvesting circuit (12) is connected to the antenna (40) and wherein the electric load (15) is connected to the energy harvesting circuit (12) via the control circuit (20) and the buffer capacitor (16).

12. A method of charging capacitors (16, 22) of a system (10), wherein the system comprises:
an energy harvesting circuit (12) connectable to an antenna (14) and configured to execute an autonomous matching procedure to match the antenna (14) to an electric load (15);
a buffer capacitor (16) connected to the energy harvesting circuit (14);
a control circuit (20) connected to the energy harvesting circuit (14);
an auxiliary capacitor (22) connectable to the energy harvesting circuit (14), the method comprising the steps of:
charging the buffer capacitor (16);
executing the autonomous matching procedure; and
charging the auxiliary capacitor (22) during execution of the autonomous matching procedure, wherein the auxiliary capacitor (22) is charged by excess current provided by a voltage limiter (26) of the control circuit (20) during execution of the autonomous matching procedure.

13. The method according to claim 12, wherein execution of the autonomous matching procedure is initiated when the buffer capacitor (16) has been charged to a first charge level by the energy harvesting circuit (12).

14. A system (10) comprising:

an energy harvesting circuit (12) connectable to an antenna (14) and configured to execute an autonomous matching procedure to match the antenna (14) to an electric load (15);

a buffer capacitor (16) connected to the energy harvesting circuit (14) and chargeable by the energy harvesting circuit (14);

a control circuit (20) connected to the energy harvesting circuit (14) and to the buffer capacitor (16) and connectable to the electric load (15), wherein the control circuit (20) is configured to control a supply voltage of the electric load (15); and wherein the control circuit (20) comprises an auxiliary capacitor (22) chargeable during execution of the autonomous matching procedure, the control circuit (20) comprises a voltage limiter (26) connected to an output of the energy harvesting circuit (14), and at least one of (A), (B), and (C) of which:

(A) comprises:

the voltage limiter (26) is connected to the auxiliary capacitor (22) and is operable to charge the auxiliary capacitor (22) when the control circuit (20) is in the antenna matching mode, (B) comprises:

the voltage limiter (26) comprises a shunt limiter (27) operable to shunt excess current to ground, and (C) comprises:

the control circuit (20) is either operable in an antenna matching mode or in a function mode and wherein the control circuit (20) is switchable from the antenna matching mode into the function mode upon or after completion of the autonomous matching procedure, the control circuit (20) comprises a switching arrangement (24) operable to switch the control circuit (20) between the antenna matching mode and the function mode, and the switching arrangement (24) comprises a PMOS transistor (PM3) and an NMOS transistor (NM3) and wherein a gate of the PMOS transistor (PM3) is connected to a gate of the NMOS transistor (NM3) and is connected to a switch input (34) providing a control signal being indicative of one of the antenna matching mode and the function mode.

15. The system (10) according to claim 14, wherein when the control circuit (20) is in the function mode, the auxiliary capacitor (22) is parallel to the buffer capacitor (16).

16. The system (10) according to claim 14, wherein the auxiliary capacitor (22) is chargeable by excess current provided by the shunt limiter (27) when the control circuit (20) is in the antenna matching mode.

17. The system (10) according to claim 14, wherein the auxiliary capacitor (22) is exclusively chargeable by the excess current provided by the shunt limiter (27).

18. The system (10) according to claim 14, further comprising a current mirror (30) with a first branch (31) and a second branch (32), wherein the first branch (31) forms part of the voltage limiter (26) and wherein the auxiliary capacitor (22) is connected to or forms part of the second branch (32).

19. A passive RFID circuit comprising:

an antenna (14), an electric load (15), and a system (10) according to claim 16, wherein the energy harvesting circuit (12) is connected to the antenna (40) and wherein the electric load (15) is connected to the energy harvesting circuit (12) via the control circuit (20) and the buffer capacitor (16).

*    *    *    *    *